Figure 1:
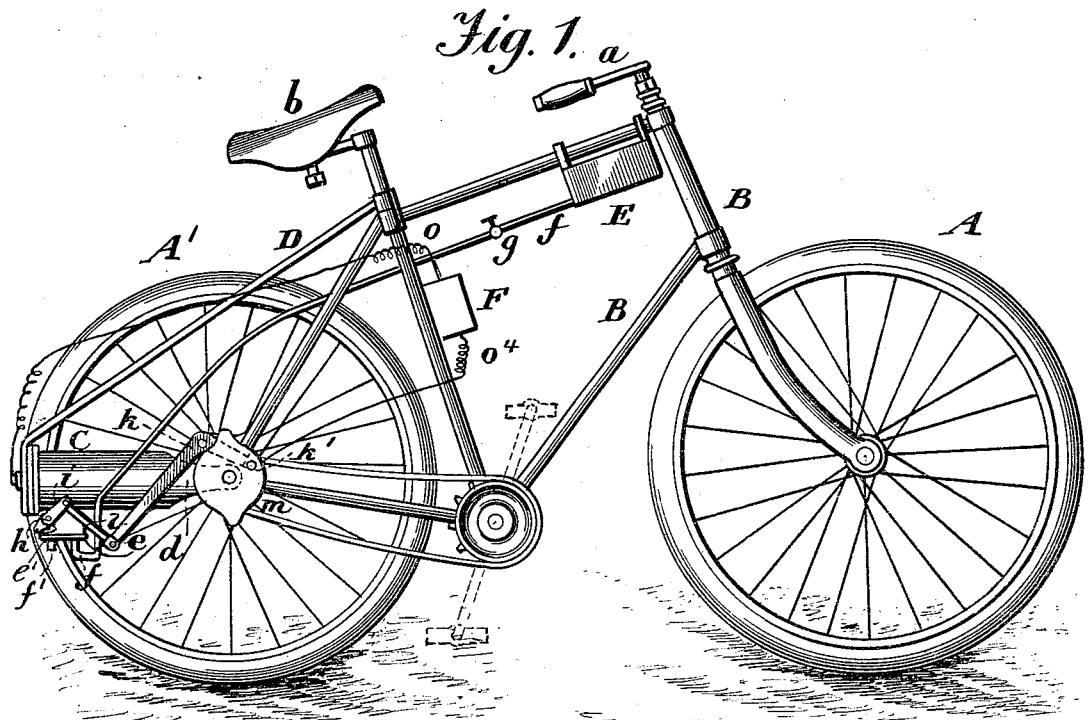

(No Model.)

E. J. PENNINGTON.
WHEELED VEHICLE.

No. 574,818.  Patented Jan. 5, 1897.

Witnesses:
A. Ruppert.
E. Cruse.

Inventor:
Edward J. Pennington,
by G. H. W. T. Howard,
attys.

THE NORRIS PETERS CO., PHOTO-LITHO., WASHINGTON, D. C.

UNITED STATES PATENT OFFICE.

EDWARD J. PENNINGTON, OF CHICAGO HEIGHTS, ILLINOIS, ASSIGNOR TO THE MOTOR CYCLE COMPANY, OF CHICAGO, ILLINOIS.

WHEELED VEHICLE.

SPECIFICATION forming part of Letters Patent No. 574,818, dated January 5, 1897.

Application filed March 21, 1893. Serial No. 467,043. (No model.) Patented in England December 11, 1895, No. 23,771.

*To all whom it may concern:*

Be it known that I, EDWARD J. PENNINGTON, of Chicago Heights, in the county of Cook and State of Illinois, have invented certain new and useful Improvements in Wheeled Vehicles, of which the following is a specification, reference being had to the accompanying drawings and to the letters of reference marked thereon.

This invention is patented in England, in Patent No. 23,771, dated December 11, 1895.

The object of my invention is to furnish a light and convenient road-vehicle driven by power obtained from a gasolene or other fluid engine.

In carrying out my invention I apply the engine to the vehicle and provide a reservoir for the fluid of capacity sufficient for a run of several hours. The engine employed is of that class in which a charge of an explosive mixture of air and gasolene or the like is admitted behind the piston and is, after compression, exploded so as to develop the necessary power.

Heretofore it has been proposed to apply explosive-fluid engines of the compression type to wheeled vehicles, but all such proposals have, so far as I am aware, included the use of special compression-cylinders and other special instrumentalities to effect the compression of the explosive mixture, and the engines proposed to be applied have been of such weight as to render their use impracticable at least for bicycles, tricycles, and similar light vehicles to run over ordinary roads. In the present invention the explosive mixture is compressed in the explosion-cylinder through the momentum of the load (or rider) on the vehicle. Apart from such load my new and improved vehicle will not run, for the compression of the explosive mixture acts as a brake, but when the rider mounts and starts the vehicle the additional weight stores the power and furnishes the momentum for overcoming the resistance opposed by the compression. I prefer to retain the usual pedal driving-gear on my new or improved vehicles, and the rider can use the same to assist in starting or in hill-climbing, although I have found it unnecessary to resort thereto even over hills of more than ordinary steepness.

While the construction extends to the general arrangement just indicated, it also comprises as special improvements the particular disposition of the foregoing, in which the engine-piston is coupled directly with a crank fast to one (or a pair) of the supporting-wheels of the vehicle, and also certain particular features in the placing and support of the engine-cylinder, as hereinafter set forth.

Figure 2:
Figure 3:
Figure 4:
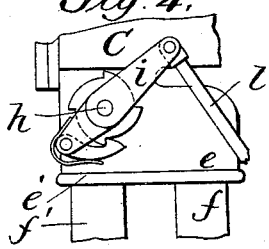

In the accompanying drawings, Figure 1 is a side elevation of a road-vehicle of the bicycle class to which my invention is applied. Fig. 2 is a sectional view of the engine-cylinder, the electric connections being also shown. Fig. 3 is a detail of the valve mechanism, and Fig. 4 is a side elevation of a detail of part of the valve mechanism.

Similar letters of reference indicate similar parts in the respective figures.

A A' are the two wheels of the vehicle, which may be of the kind ordinarily used in the improved class of bicycles, tricycles, and similar vehicles. An elastic tire, such as is shown in Fig. 1 of the drawings, is necessary under the weight of the rider to give the wheels the necessary adhesion or tractive effect, as has been fully demonstrated.

The frame proper of the vehicle is indicated generally by B. The front wheel A is, as usual, employed for steering, through the medium of the handles *a*, arranged to be under control of the rider seated upon the saddle *b*. The propelling devices ordinarily used in such vehicles, consisting of cranks, pedals, sprocket-wheels, and a driving-chain, are omitted or not, as may be desired.

The cylinder of the engine is indicated by C, it being provided with a rear head only, the front end of the cylinder being unclosed. The front part of the cylinder C is provided with an extension *d*, preferably integral therewith, having an eye which fits loosely over the axle of the wheel A' in such manner as to act as a support. The rear end of the cylinder C is secured to the rear standard of the frame B by means of a brace D, the connection being made to the rear head by means of a projection integral with the head passing through an eye $d'$ of said brace and provided with a nut outside the eye $d'$. The opposite end of the brace is attached to the rear standard in any suitable manner.

E represents the tank for holding the driving fluid, by preference gasolene, which is admitted to the branch $e$ through a pipe $f$, the admission being controlled by means of a valve $g$ and provision being made (as by one or more openings into pipe $f$ between the valve $g$ and the branch $e$) for the admission of air to mix with the gasolene vapors and form the explosive charge. The branch $e'$ is that to which the exhaust-pipe $f'$ is attached. The admission of the explosive mixture to the rear end of the cylinder and the exhaust resulting from the explosion of the gases are controlled through the medium of a tapering valve-barrel $h$, made with ports in the usual manner. The valve-barrel $h$ is provided with an arm $i$, attached to the long arm of a valve-lever or bell-crank $k$ by means of a link $l$, the short arm of said valve-lever or bell-crank being provided with a device $k'$, which enters the groove of a valve-operating cam $m$, mounted upon the axle of the rear wheel A. In the revolution of said axle the necessary movements of the tapered valve-barrel $h$ are given to control the admission and exhaust of the explosive and exploded mixture.

The cylinder C is furnished with a piston having a connecting-rod $n$ attached thereto by means of a ball-and-socket joint, which admits of the oscillation of said connecting-rod necessary in view of its connection to the crank $n'$, mounted upon the axle of the rear wheel A' and fast to said wheel, so that the crank turns with it.

An electric battery F is mounted upon the frame of the vehicle, and a wire $o$ passes from one pole thereof through the rear head of the cylinder C, the inner end of the wire being furnished with a contact-piece $o'$ for engaging a similar contact-piece $o^2$ on the outer end of the piston at the termination of its back stroke. The circuit is completed by means of a contact-piece $o^3$, bearing against the axle of the rear wheel A', and a wire $o^4$, reaching from said contact-piece $o^3$ to the opposite pole of the battery F, the current passing through the metal of the cylinder, connecting-rod, &c. The arrangement is such that the charge of air and gasolene or other fluid is exploded by the separation of the contact-piece $o^2$ of the piston from the contact-piece $o'$ at the rear head of the cylinder.

The parts being at the end of an instroke of the piston preparatory to an explosion the valve $h$ closes the port $e^\times$ by which both inlet and exhaust communicate with the interior of the cylinder. The explosive charge is supposed to have been compressed in the end of the cylinder during the previous instroke of the piston. As the piston moves outward the contacts $o'$ $o^2$ are separated, the spark passes, an explosion takes place, and the piston is forced out, turning the wheel and propelling the vehicle. As the piston finishes its outstroke and returns the cam $m$ acts through lever and link to shift the valve $h$ and opens the communication between the port $e^\times$ and the exhaust $f'$. The valve being held open by the cam the piston on its instroke forces out the products of the explosion. After the piston has finished its instroke the cam $m$ shifts the valve $h$ and puts the port $e^\times$ in communication with the inlet $f$. The forward motion of the piston sucks in the air and gasolene vapors, and at the end of the outstroke the cam $m$ shifts the valve back into the closed position. The instroke of the piston (under the momentum of the rider or load of the vehicle) then compresses the explosive mixture while the valve is closed, and the ignition and explosion of the compressed charge and subsequent operations then take place in order, as already mentioned. This cycle of inspiration, compression, explosion, expansion, and exhaustion in two revolutions of the crank-shaft is common in explosive-engines of the compression type.

It is obvious that my invention is applicable to a vehicle of the tricycle or other class as well as to one of the bicycle order.

Having described my invention, I claim—

1. In a wheeled vehicle, an explosive propelling-engine comprising a cylinder supported in a horizontal position behind the rear axle by means of an extension of said cylinder at the end adjacent to the said axle and a brace extending obliquely upward from the opposite end of said cylinder to a higher portion of the vehicle-frame, substantially as described.

2. In a wheeled vehicle, a propelling-cylinder open at its forward and closed at its rear end and provided with an extension for loose connection with the rear axle, and a brace attaching the rear end of said cylinder to a higher portion of the vehicle-frame, substantially as described.

EDWARD J. PENNINGTON.

Witnesses:
 THEO. H. WIEDERHOLD,
 K. HERRMANN.